US012632892B2

(12) United States Patent
Young

(10) Patent No.: US 12,632,892 B2
(45) Date of Patent: May 19, 2026

(54) AUTOMATED CHECK REORDERING SYSTEM AND METHOD

(71) Applicant: Truist Bank, Charlotte, NC (US)

(72) Inventor: Heather Young, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 106 days.

(21) Appl. No.: 18/437,090

(22) Filed: Feb. 8, 2024

(65) Prior Publication Data

US 2025/0259218 A1 Aug. 14, 2025

(51) Int. Cl.
| | |
|---|---|
| *G06Q 30/0601* | (2023.01) |
| *G06F 9/451* | (2018.01) |
| *G06K 19/06* | (2006.01) |
| *G06Q 20/04* | (2012.01) |
| *G06Q 20/10* | (2012.01) |
| *G06Q 40/02* | (2023.01) |

(52) U.S. Cl.
CPC ......... *G06Q 30/0631* (2013.01); *G06F 9/451* (2018.02); *G06K 19/06037* (2013.01); *G06Q 20/042* (2013.01); *G06Q 20/108* (2013.01); *G06Q 40/02* (2013.01)

(58) Field of Classification Search
CPC .... G06Q 30/0631; G06Q 40/02; G06F 9/451; G06K 19/06037
See application file for complete search history.

(56) References Cited

U.S. PATENT DOCUMENTS

| | | | | |
|---|---|---|---|---|
| 7,654,447 B1 * | 2/2010 | Barth | ..................... | G06Q 20/04 |
| | | | | 705/45 |
| 7,717,328 B1 * | 5/2010 | Barth | ................... | G06Q 20/042 |
| | | | | 235/375 |
| 7,788,175 B1 * | 8/2010 | Hadfield | ............... | G06Q 40/02 |
| | | | | 705/42 |
| 8,150,771 B1 * | 4/2012 | Baram | ................... | G06Q 40/00 |
| | | | | 705/45 |
| 8,417,639 B1 * | 4/2013 | Baram | ................... | G06Q 40/02 |
| | | | | 705/45 |
| 10,755,343 B2 * | 8/2020 | Lutnick | ................... | G07F 17/24 |
| 11,460,976 B2 * | 10/2022 | Fan | ...................... | G06F 3/04817 |
| 2005/0182725 A1 * | 8/2005 | Modica | ................ | G06Q 20/042 |
| | | | | 705/45 |
| 2008/0159655 A1 * | 7/2008 | Breeden | ................. | G06Q 40/00 |
| | | | | 382/306 |
| 2008/0215485 A1 * | 9/2008 | Tsang | ..................... | G06Q 40/02 |
| | | | | 705/40 |
| 2014/0319212 A1 * | 10/2014 | Gannon | ............. | G06Q 20/3278 |
| | | | | 235/380 |
| 2016/0275491 A1 * | 9/2016 | Kaladgi | .............. | H04L 63/0853 |
| 2016/0277363 A1 * | 9/2016 | Kaladgi | .............. | H04L 63/0428 |
| 2019/0034952 A1 * | 1/2019 | Loomis | ................ | G06Q 20/322 |
| 2019/0043103 A1 * | 2/2019 | De Las Heras | ...... | G06Q 20/405 |
| 2022/0198495 A1 * | 6/2022 | Furphy | .............. | G06Q 30/0635 |
| 2023/0020878 A1 * | 1/2023 | Bowie | ................... | G06Q 20/18 |

* cited by examiner

*Primary Examiner* — Oluseye Iwarere
(74) *Attorney, Agent, or Firm* — Jordan IP Law LLC; Michael A. Springs, Esq.

(57) ABSTRACT

An apparatus, computing device, computer program product, and a computer-implemented method for delivering financial services and, more particularly, the facilitation of a check replenishing order within a secure, authenticated environment. Because the client has already been authenticated, the client can bypass a separate path requiring separate authentication.

12 Claims, 9 Drawing Sheets

131A

Figure 7:
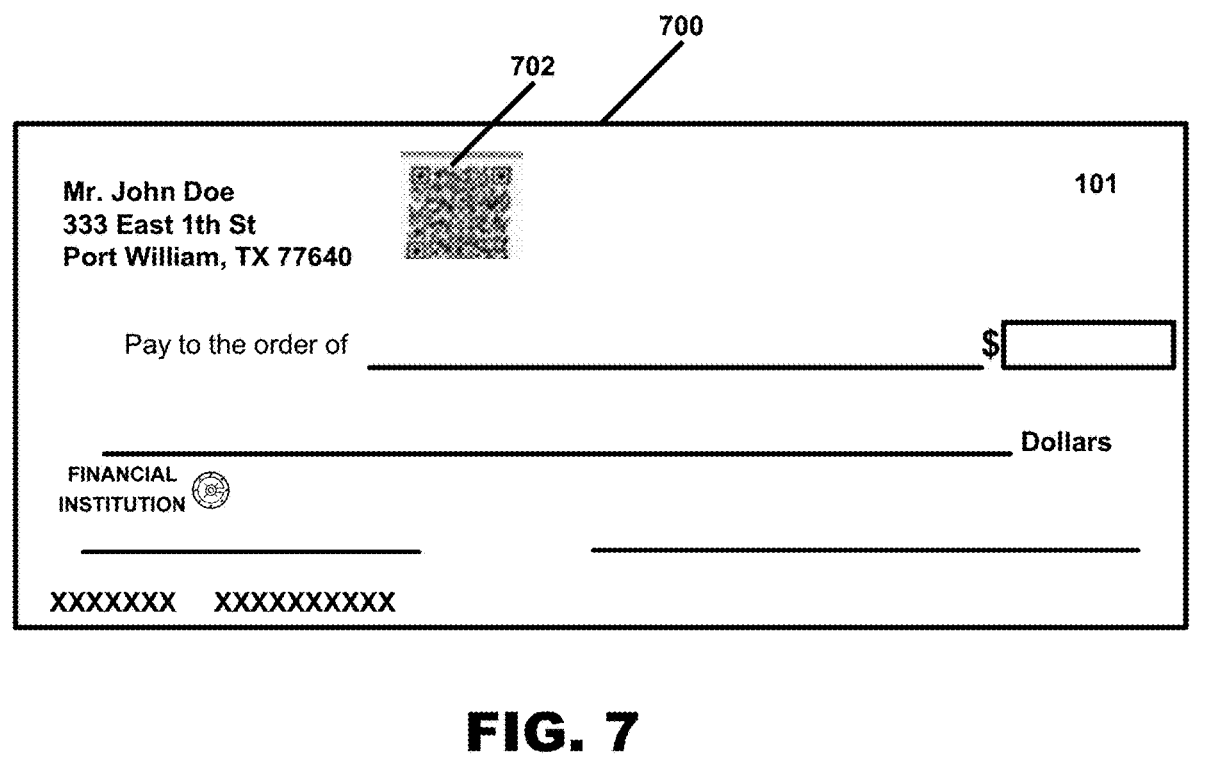

700

702

Mr. John Doe
333 East 1th St
Port William, TX 77640

101

Pay to the order of _____ $ ____

_____ Dollars

FINANCIAL
INSTITUTION

_____        _____

XXXXXXX    XXXXXXXXXX

AUTOMATED CHECK REORDERING SYSTEM AND METHOD

TECHNICAL FIELD

The present disclosure relates to an apparatus, computing device, computer program product, and a computer-implemented method for delivering financial services and, more particularly, the facilitation of a check replenishing order within a secure, authenticated environment. Because the client has already been authenticated, the client can bypass a separate path requiring separate authentication.

BACKGROUND

Financial institutions that provide financial services are increasingly providing a greater number of client services. Traditional client services extended by financial institutions required in-person visits by clients. Accordingly, financial institutions focused on in-person client interaction to enhance the quality of services. This simplified model of financial services, while still in use, has been greatly expanded.

Financial institutions now offer digital or online financial services clients, thereby obviating the need for in-person visits to the financial institution. In this way, clients can receive financial services at home via a computing device in order to access and manage one or more user accounts, such as online bill payments, money transfers, etc.

While user receipt of digital or online financial services is convenient, financial institutions would like to maintain the same level of safety and quality of service received by clients during in-person visits.

SUMMARY

One or more embodiments of the present disclosure relate to an apparatus, computing device, computer program product, and a computer-implemented method for delivering financial services and, more particularly, the facilitation of a check replenishing order within a secure, authenticated environment. Because the client has already been authenticated, the client can bypass a separate path requiring separate authentication.

In accordance with one or more embodiments set forth, illustrated, and described herein, an apparatus comprises one or more of the following: one or more processors; and a non-transitory memory coupled to the one or more processors, the non-transitory memory including a set of instructions, which when executed by the one or more processors, cause the apparatus to: receive communications from and transmit communications to a client over a secure network after an authentication process to determine the veracity of the client and create a secure environment; transmit a dashboard with client account information to the client; determine if the client requires new checks; cause, based on the determination that the client requires more checks, the dashboard to display a widget allowing the client to order more checks; and receive an indication from the client that more checks are to be reordered.

In accordance with the apparatus, the set of instructions, which when executed by the one or more processors, cause the apparatus to: transmit a message in the widget instructing the client that checks need to be reordered.

In accordance with the apparatus, wherein the set of instructions, which when executed by the one or more processors, cause the apparatus to further: include in the widget a quick response (QR) code to allow the client to scan and transmit information allowing for the population of the checks to be reordered without exiting the secure environment.

In accordance with the apparatus, wherein the set of instructions, which when executed by the one or more processors, cause the apparatus to further: include in the message a link to a check replenish entity within the secure environment.

In accordance with one or more embodiments set forth, illustrated, and described herein, a computing device comprises one or more of the following: one or more processors; and a non-transitory memory coupled to the one or more processors, the non-transitory memory including a set of instructions, which when executed by the one or more processors, cause the computing device to: receive communications from and transmit communications to a client over a secure network after an authentication process to determine veracity of the client and create a secure environment; transmit a dashboard with client account information to the client; determine if the client requires new checks; cause, based on the determination that the client requires more checks, a dashboard to display a widget allowing the client to order more checks; and receive an indication from the client that more checks are to be reordered.

In accordance with the computing device, wherein the set of instructions, which when executed by the one or more processors, cause the computing device to: transmit a message in the widget instructing the client that checks need to be reordered.

In accordance with the computing device, wherein the set of instructions, which when executed by the one or more processors, cause the computing device to further: include in the widget a quick response (QR) code to allow the client to scan and transmit information allowing for the population of the checks to be reordered without exiting the secure environment.

In accordance with the computing device, wherein the set of instructions, which when executed by the one or more processors, cause the computing device to further: include in the message a link to a check replenish entity within the secure environment.

In accordance with one or more embodiments set forth, illustrated, and described herein, a computer-implemented method comprises one or more of the following: receiving communications from and transmitting communications to a client over a secure network after an authentication process to determine veracity of the client and create a secure environment; transmitting a dashboard with client account information to the client; determining if the client requires new checks; causing, based on the determination that the client requires more checks, the dashboard to display a widget allowing the client to order more checks; and receiving an indication from the client that more checks are to be reordered.

In accordance with the computer-implemented method: transmit a message in the widget instructing the client that checks need to be reordered.

In accordance with the computer-implemented method, including in the widget a quick response (QR) code to allow the client to scan and transmit information allowing for the population of the checks to be reordered without exiting the secure environment.

In accordance with the computer-implemented method, including in the message a link to a check replenish entity within the secure environment.

DRAWINGS

The various advantages of the exemplary embodiments will become apparent to one skilled in the art by reading the following specification and appended claims, and by referencing the following drawings, in which:

Figure 5:
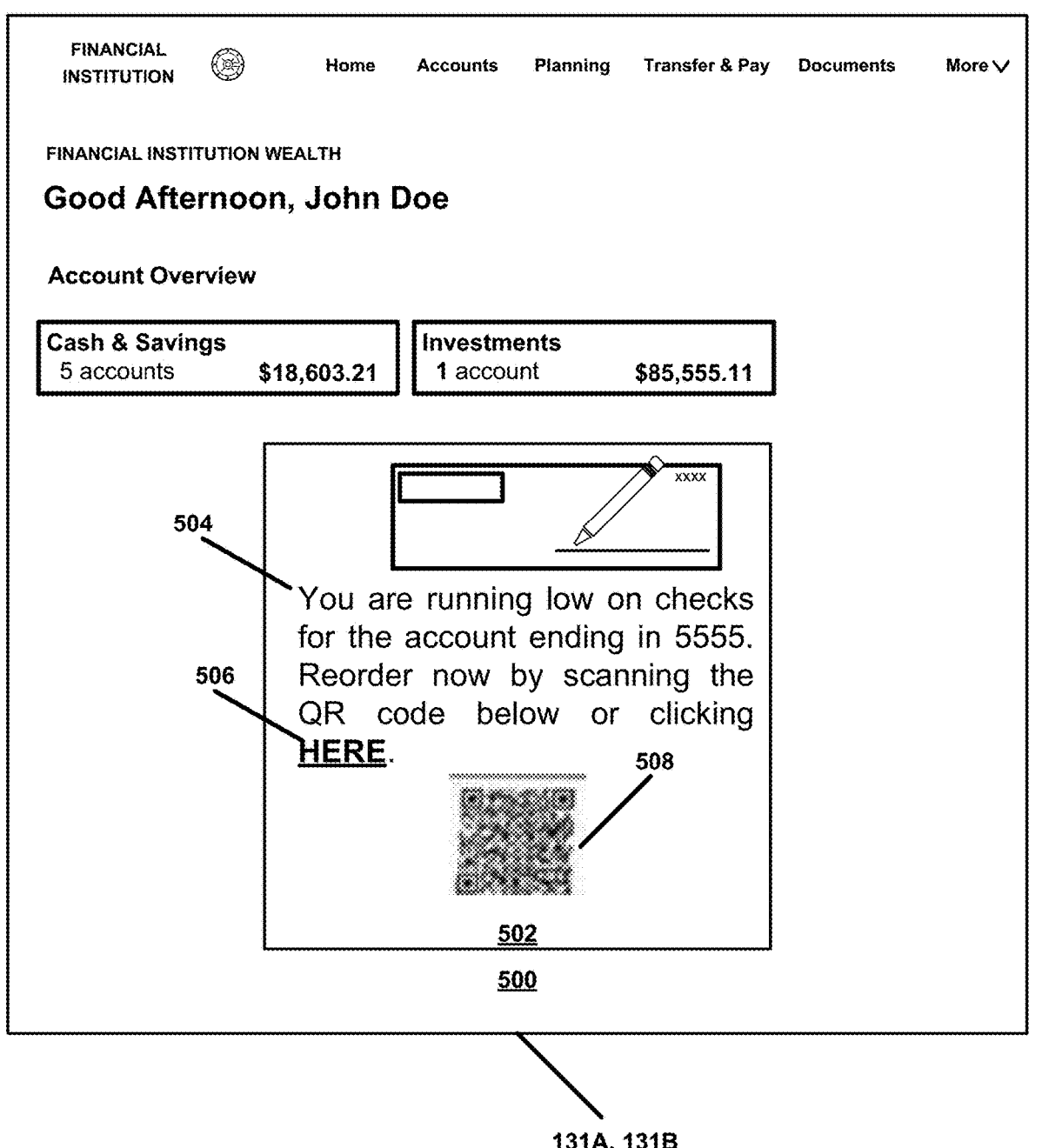
Figure 6:
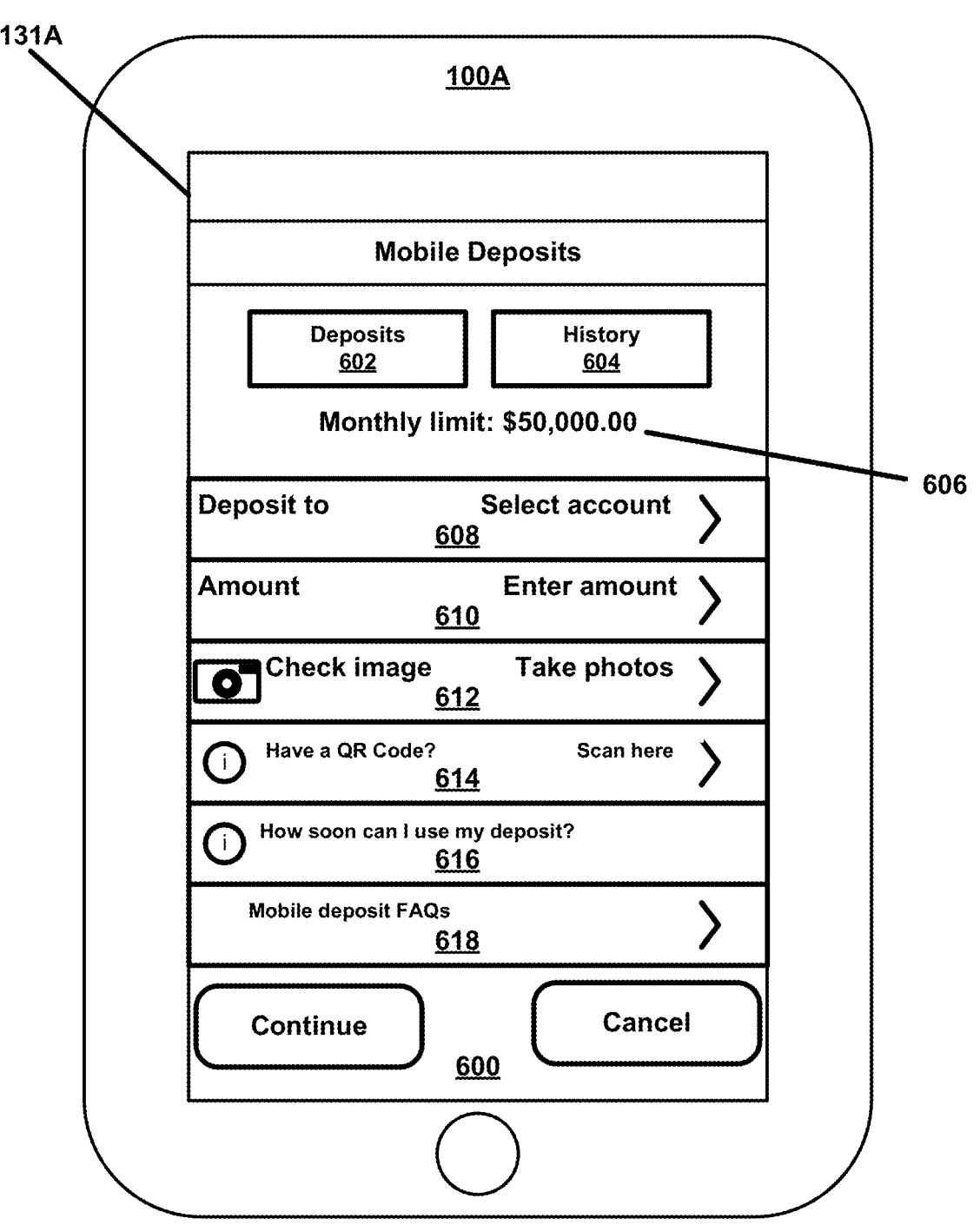

FIGS. 5 and 6 respectively illustrate a dashboard that includes a check replenishment widget, in accordance with one or more embodiments set forth and described herein.

FIG. 7 illustrates a check produced in accordance with one or more embodiments set forth and described herein.

Figure 8:
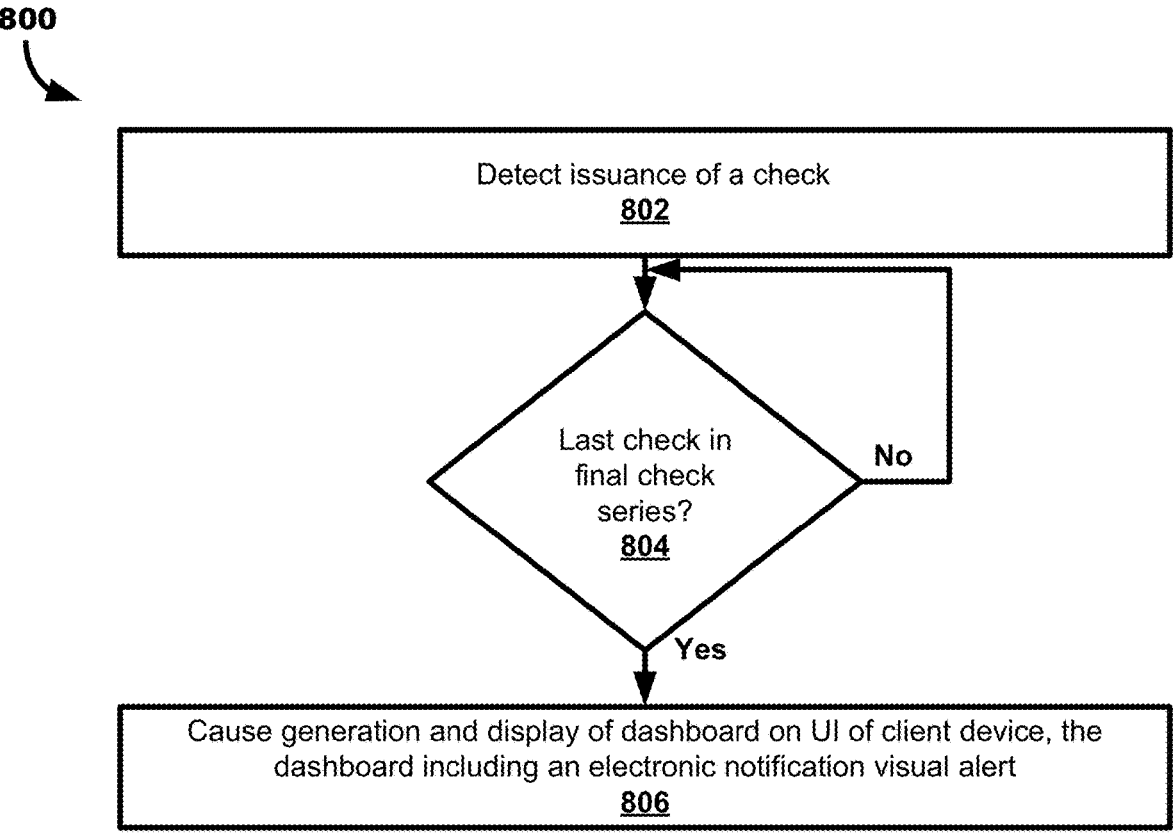
Figure 9:
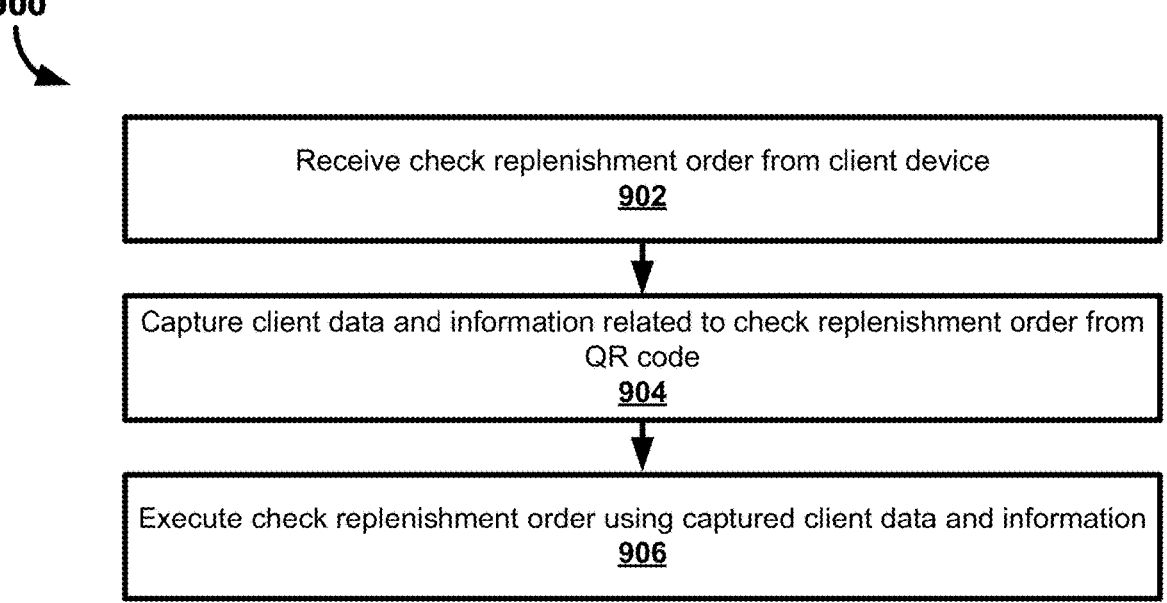

FIGS. 8 and 9 respectively illustrate a computer-implemented method, in accordance with one or more embodiments set forth and described herein.

DESCRIPTION

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a financial institution mobile application, web application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code running or executing on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

As used herein, "widget" relates to electronic visual tiles that may be added to a home screen dashboard that are bigger than a regular application icon and have additional functionality. The widget may include shortcuts directly to popular features within a financial application.

A communication environment that facilitates enhanced user communication with a financial institution in support of user access and user management of user accounts at the financial institution. Upon the launching of a dashboard of financial institution on a client device, a user may transmit data related to one or more user accounts, and also receive data and information on one or more branch employees based on the geographic location of the user, or a user request or query for one or more financial services that are offered by the financial institution. Such data may be encrypted during communications between the client device and the one or more financial services.

Figure 1:
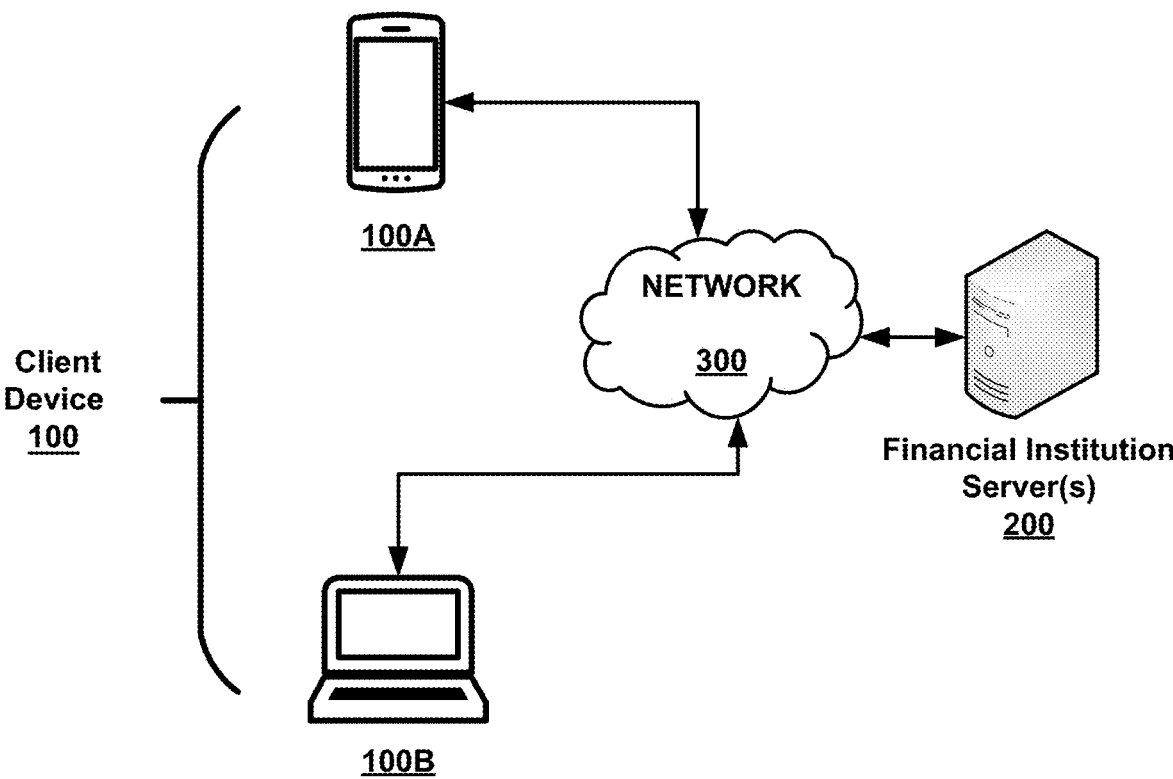
FIG. 1 illustrates a communication environment, in accordance with one or more embodiments set forth and described herein.

Turning to the figures, in which FIG. 1 illustrates a communication environment in which a user communicates with a financial institution. A client or user device 100 operating in the communication environment facilitates user access to and user management of one or more user accounts residing at one or more financial institution servers 200 of the financial institution. The communication environment includes the user device 100, the one or more financial institution servers 200, and a communications network 300 through which communication is facilitated between the user device 100 and the one or more financial institution servers 200.

In accordance with one or more embodiments set forth, described, and/or illustrated herein, the client or user device 100 comprises a computing device, including but not limited to a smart phone (e.g., 100A), personal computing device (e.g., 100B), a laptop computer, a handheld personal computer, a workstation, a game console, a cellular phone, a mobile device, a wearable electronic device, a smartwatch, smart eyewear, a tablet computer, a convertible tablet computer, or any other electronic, microelectronic, or microelectromechanical device for processing and communicating data. This disclosure contemplates the user device 100 comprising any form of electronic device that optimizes or otherwise transforms the performance and functionality of the one or more embodiments in a manner that falls within the spirit and scope of the principles of this disclosure.

In accordance with one or more embodiments set forth, described, and/or illustrated herein, each server in the one or more financial institution servers 200 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

Figure 2:
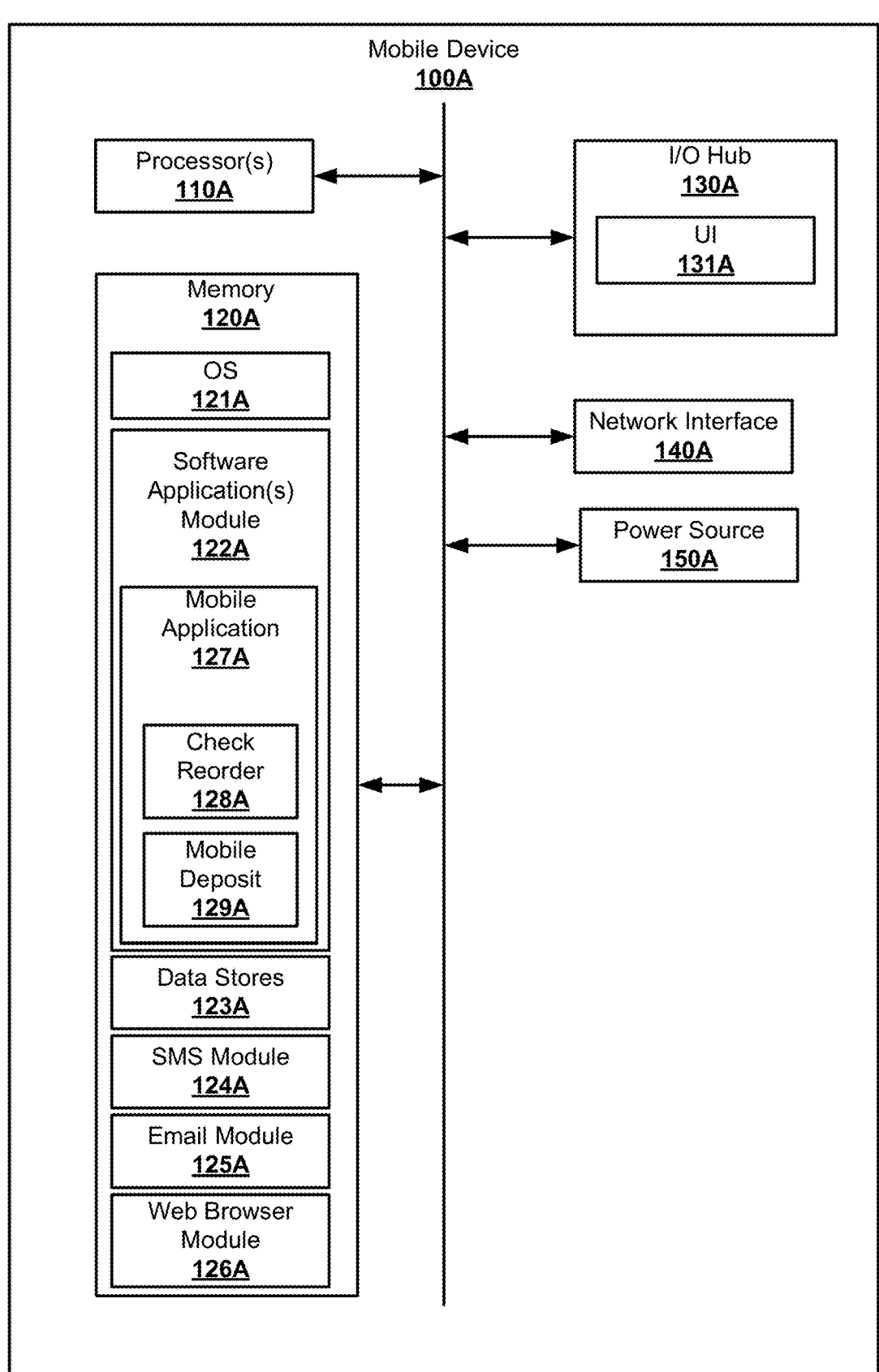
FIG. 2 illustrates a block diagram of the mobile device of FIG. 1.

In the illustrated example embodiment of FIG. 2, the user or client device 100 comprises a mobile device 100A. Some of the possible operational elements of the mobile device 100A are illustrated in FIG. 2 and will now be described herein. It will be understood that it is not necessary for the mobile device 100A to have all the elements illustrated in FIG. 2. For example, the mobile device 100A may have any combination of the various elements Illustrated in FIG. 2. Moreover, the mobile device 100A may have additional elements to those illustrated in FIG. 2.

The mobile device 100A includes one or more processors 110A, a non-transitory memory 120A operatively coupled to the one or more processors 110A, an I/O hub 130A, a network interface 140A, and a power source 150A.

The memory 120A comprises a set of instructions of computer-executable program code. The set of instructions are executable by the one or more processors 110A to cause execution of an operating system 121A and one or more software applications of a software application module 122A that reside in the memory 120A. The one or more software applications residing in the memory 120A includes, but is not limited to, a financial institution application that is associated with the financial institution. The financial institution application comprises a financial institution mobile application 127A that facilitates establishment of a secure connection between the mobile device 100A and the one or more financial institution servers 200. The financial institution mobile application 127A includes check reordering or replenishment application 128A that facilitates check reordering or replenishment by a client. The financial institution mobile application 127A further includes a mobile deposit application 129A having one or more mobile deposit fields that facilitate mobile deposit of a financial instrument into a designated financial account among the one or more financial accounts. The one or more processors 110A are operable to execute the financial institution mobile application 127A to facilitate user access to the one or more user accounts and user management of the one or more user accounts.

The memory 120A also includes one or more data stores 123A that are operable to store one or more types of data. The mobile device 100A may include one or more interfaces that facilitate one or more systems or modules thereof to transform, manage, retrieve, modify, add, or delete, the data residing in the data stores 123A. The one or more data stores 123A may comprise volatile and/or non-volatile memory. Examples of suitable data stores 123A include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123A may be a component of the one or more processors 110A, or alternatively, may be operatively connected to the one or more processors 110A for use thereby. As set forth, described, and/or illustrated herein, "operatively connected" may include direct or indirect connections, including connections without direct physical contact.

The memory 120a also includes an SMS module 124A operable to facilitate user transmission and receipt of text messages via the mobile device 100A though the network 300. In one example embodiment, a user may receive text messages from the financial institution that are associated with the user access and the user management of the one or more user accounts. An email module 125A is operable to facilitate user transmission and receipt of email messages via the mobile device 100A through the network 300. In one example embodiment, a user may receive email messages from the financial institution that are associated with the user access and the user management of the one or more user accounts. A user may utilize a web browser module 126A that is operable to facilitate user access to one or more websites associated with the financial institution through the network 300.

In accordance with one or more embodiments set forth, described, and/or illustrated herein, the mobile device 100A includes an I/O hub 130A operatively connected to other systems and subsystems of the mobile device 100A. The I/O system 130A may include one or more of an input interface, an output interface, and a network controller to facilitate communications between the client device 100 and the server 200. The input interface and the output interface may be integrated as a single, unitary user interface 131A, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100A may serve as both a component of the input interface and a component of the output interface.

The mobile device 100A includes a network interface 140A operable to facilitate connection to the network 300. The mobile device 100A also includes power source 150A that comprises a wired powered source, a wireless power source, a replaceable battery source, or a rechargeable battery source.

Figure 3:
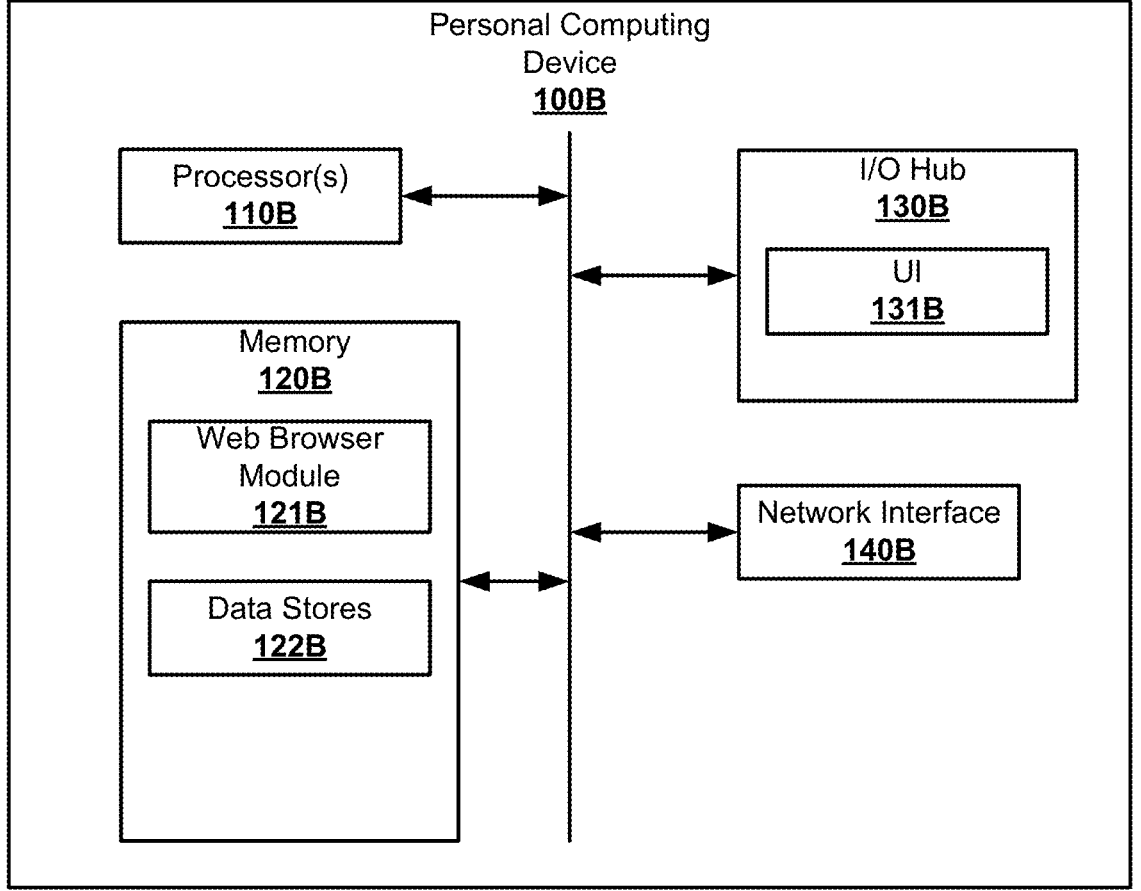
FIG. 3 illustrates a block diagram of the personal computing device of FIG. 1.

In the illustrated example embodiment of FIG. 3, the user or client device 100 comprises personal computing device 100B. Some of the possible operational elements of the personal computing device 100B are illustrated in FIG. 3 and will now be described herein. It will be understood that it is not necessary for the personal computing device 100B to have all the elements illustrated in FIG. 3. For example, the personal computing device 100B may have any combination of the various elements illustrated in FIG. 3. Moreover, the personal computing device 100B may have additional elements to those illustrated in FIG. 3.

The personal computing device 100B includes one or more processors 110B, a non-transitory memory 120B operatively coupled to the one or more processors 110B, an I/O hub 130B, and a network interface 140B.

The memory 120B comprises a set of instructions of computer-executable program code. The set of instructions are executable by the one or more processors 110B to cause control of the web browser module 121B in a manner that facilitates user access to a web browser having one or more websites associated with the financial institution through the network 300.

The memory 120B also includes one or more data stores 122B that are operable to store one or more types of data. The personal computing device 100B may include one or more interfaces that facilitate one or more systems or modules thereof to transform, manage, retrieve, modify, add, or delete, the data residing in the data stores 122B. The one or more data stores 122B may comprise volatile and/or non-volatile memory. Examples of suitable data stores 122B include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122B may be a component of the one or more processors 110B, or alternatively, may be operatively connected to the one or more processors 110B for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 110A, 110B may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110A, 110B may comprise at least one hardware circuit (e.g., an integrated circuit) operable to carry out instructions contained in program code. In embodiments in which there is a plurality of processors, such processors may work independently from each other, or one or more processors may work in combination with each other.

Figure 4:
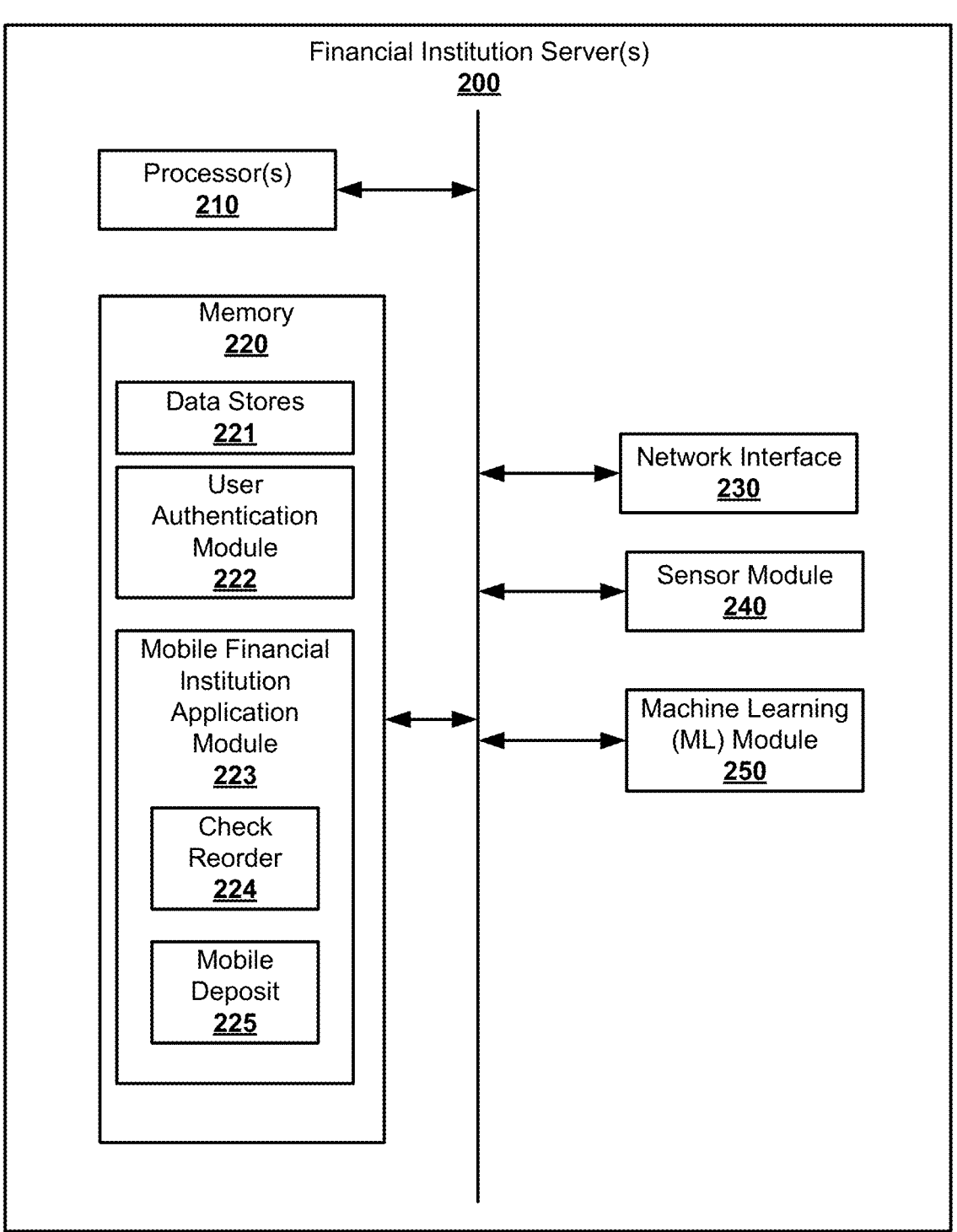
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222 and a mobile financial institution application module 223 having one or more mobile financial institution applications that reside in the memory 220. For example, the mobile financial institution application module 223 includes a check reordering or replenishment application 224 that facilitates check reordering or replenishment by a client and a mobile deposit application 225 that facilitates mobile deposit of a financial instrument into a designated financial account among the one or more financial accounts. In accordance with one or more embodiments set forth, described, and/or illustrated herein, the one or more financial institution servers 200 may individually or collectively execute the instructions to perform any one or more of the methodologies set forth, described, and illustrated herein.

The memory 220 also includes one or more data stores 221 that are operable to store one or more types of data, including but not limited to, user account data, user authentication data, sensor data, etc. For instance, the one or more data stores 221 may comprise a storage location on which resides one or more electronic files of data and information associated with wireless network connectivity data, stored geographic location data, and sensor data. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the server(s) to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The computer-executable program code may instruct the one or more processors 210 to cause the user authentication module 222 to authenticate a user in order to gain user access to the one or more user accounts. The user authentication module 222 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 223 are operable to communicate with the client device 100 in a manner which facilitates user access to the one or more user accounts in addition to user management of the one or more user accounts based on successful user authentication. The data exchanged between the client device and the one or more financial services may be encrypted during communications therebetween.

The sensor module 240 is operable, at least during execution of the financial institution mobile application 127A by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the user or client device 100 and the one or more financial institution servers 200, while also enhancing user access and user management of the one or more user accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute a financial institution mobile application 127A associated with the financial institution over the communication network 300. Upon being authenticated by the user authentication module 222, the user may transmit via the client device 100, a service request or query to the one or more financial institution server(s) 200 for one or more financial services that are offered by the financial institution. Such financial services may include, but are not limited to, personal financial services, commercial financial services, and wealth management financial services.

Responsive to receipt of the service request transmission, the set of instructions are executable by the one or more processors 210 to cause the one or more processors 210 to transmit a request or query to the client device 100 to authorize a detection of the current geographic location of the client device 100. Responsive to the one or more financial institution server(s) 200 receiving authorization from the client device 100, the set of instructions are executable by the one or more processors 210 to cause the one or more financial institution server(s) 200 to detect the current geographic location of the client device 100. Alternatively, this disclosure contemplates the request or query to authorize the detection of the current geographic location of the client device 100 occurring temporally before user authentication is conducted.

The set of instructions are executable by the one or more processors 210 to cause the one or more financial institution server(s) 200 to dynamically conduct a geographic location analysis of wireless network connectivity data, stored geographic location data residing in the memory 220, and sensor data relating to the detected current geographic location of the client device 100. The wireless network connectivity data may include but is not limited to, an internet protocol (IP) address of the client device 100, network identifier for the network 300, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs, etc. The sensor data may include but is not limited to, global positioning system (GPS) data of the client device 100. This disclosure contemplates conducting the geographic location analysis based on any data indicative of a geographic location of the client device 100 and which optimizes or otherwise transforms the performance and functionality of the one or more embodiments in a manner that falls within the spirit and scope of the principles of this disclosure.

As illustrated in FIG. 5, the computer-executable program code may instruct the one or more processors 210 to cause a generation and display of a dashboard 500 on the UI 131A, 131B of the user or client device 100 after the client has logged into their account with the financial institution and is in a secure, authenticated environment. One of the goals of a financial institution is to create a frictionless environment after the client logs in to allow the client to conduct as much business as possible without having to re-authenticate or go to another site which will require a login and authentication procedure.

The computer-executable program code may instruct the one or more processors 210 to cause generation of a plurality of financial related information and data on the dashboard 500, including, but not limited to, a user account overview in the secure environment. The computer-executable program code may further instruct the one or more processors 210 to cause generation of a check replenishment widget 502 on the dashboard 500. The computer-executable program code (e.g., Insight) may instruct the one or more processors 210 to be connected to all eligible checking accounts (e.g., personal, business, etc.) of the client and monitor the checks that are written, deposited, and withdrawn to the financial institution 200 and other financial institutions in the banking system. When the first check, such as, for example, check 700 (FIG. 7) of the last book in a series is detected (or, alternatively, another predetermined check replenishment criteria), the one or more processors 210 will trigger an alert to the client that it is time to replenish checks in the form of a display of the check replenishment widget 502.

The check replenishment widget 502 will display an electronic notification (or message) 504 informing the client that a particular account is running low on checks. Embedded in the electronic notification (or message) 504 is a user-engageable link 506 that facilitates check reordering or replenishment by the client. The check replenishment widget 502 also includes a machine-readable two-dimensional barcode such as a quick response (QR) code 508 that also facilitates check reordering or replenishment by the client. The electronic notification can be in the form of a pop-up inside the check replenishment widget 502. In alternative embodiments, the electronic notification could also include an email or text message to the client requesting that they login to their financial institution dashboard 500 in which the check replenishment widget 502 will pop-up. Should the client choose to not undergo check reordering or replenishment at the time of the notification 512, it can choose to hide the check replenishment widget 502 for a predetermined time period (e.g., 30 days) so that it can be displayed (pop up) again later or opt out entirely and close the check replenishment widget 502.

Scanning the QR code 508 with an on-screen QR code scanner or engaging the link 506 will connect the client directly to the check replenish entity while staying in the secure environment. The client and client device 100 have already been authenticated, which allows the client to bypass a separate path to the check replenish entity which would require the client to undergo separate authentication. When connecting through the QR code 508, the client's information is already pre-populated into the checks from information contained in the QR code. The check re-order system works in an application, mobile device, website, and tablet and is therefore accessible under the American Disabilities Act (ADA). Upon receiving the check replenishment information from the client, the financial institution (or an authorized third party) prints the checks for delivery to the client.

FIG. 6 shows a mobile processing application available on a financial institution application that is executing on a client device 100. As illustrated in FIG. 6, the computer-executable program code may instruct the one or more processors 110A and 210 to cause display of a mobile deposits dashboard 600 on a UI 131A of the user or client device 100 after client authentication with the financial institution. The dashboard 600 includes a plurality of user-engageable toggles, tiles, switches, tabs, icons, etc. 602, 604, 606, 608, 612, 612, 614, 616, and 618 containing information and data related to the one or more financial accounts of the client at the financial institution. Such user-engageable toggles, tiles, switches, tabs, icons, etc. include, but are not limited to, deposit accounts 602, history 604, and monthly limit 606. More relevant to mobile deposit activity, one or more user-engageable tiles 608, 610, 610. A deposit tile 608 has a user engageable arrowhead that allows the client to expand the list of financial accounts to enable the user to selectively make a mobile deposit. An amount tile 610 has a user engageable arrowhead that allows the client to populate a field indicating a deposit amount. A check image tile 612 has a user engageable arrowhead that allows the client to take an image (e.g., using a camera) of the check(s) associated with the mobile deposit. A QR code tile 616 has a user engageable arrowhead that allows the client to use a QR code containing relevant data and information that may be automatically populated in fields (e.g., deposit amount, etc.) associated with the mobile deposit.

The system and computer-implemented method(s) described herein may be at least partially processor-implemented, the processors 110A, 110B, 210 being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a plurality of machines. In some example embodiments, the one or more processors or processor-implemented modules may be located in a single geographic location (e.g., within a home environment, an office environment, or a server farm). In other example embodiments, the one or more processors or processor-implemented modules may be distributed across a plurality of geographic locations.

FIGS. 8 and 9 set forth a computer-implemented methods 800, 900. In one or more examples, the flowchart of the computer-implemented methods 800, 900 may be implemented by the one or more processors 110A, 110B of the mobile device 100A or personal computing device 100B as well the one or more processors 210 of the one or more financial institution servers 200. In particular, the computer-implemented method 800 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more mobile device 100A or personal computing device 100B or one or more financial institution servers 200 provides functionality described or illustrated herein. In particular, software executed by the one or more processors 110A, 110B, or 210 is operable to perform one or more processing blocks of each computer-implemented method 800, 900 set forth, described, and/or illustrated herein, or provides functionality set forth, described, and/or illustrated.

As illustrated in FIG. 8, illustrated process block 802 of computer-implemented method 800 includes detecting the issuance of a check in a series of checks associated with a financial account of a client at a financial institution.

The computer-implemented method 800 may then proceed to illustrated decision block 804, which includes executing a determination or monitoring of whether the first check in a last or final series of checks has been issued by the client.

Should the determination in decision block 804 be answered in the negative or "No," the computer-implemented method 800 may then return to illustrated process block 802, i.e., continue to detect or monitor the issuance of checks.

Should, on the other hand, the determination in decision block 804 be answered in the affirmative or "Yes," the computer-implemented method 800 may then proceed to illustrated process block 806, which includes causing a generation and display of a dashboard (e.g., dashboard 500) having a check replenishment widget (e.g., replenishment widget 502) on a user interface (e.g., UI 131A, 131B) on the client device (e.g., client device 100) after the client has logged into their account with the financial institution and is in a secure, authenticated environment.

In accordance with illustrated process block 806, the check replenishment widget 502 displays an electronic notification (or message) (e.g., electronic notification 504) informing the client that a particular account is running low on checks.

In accordance with illustrated process block 806, a user-engageable link (e.g., user-engageable link 506) is embedded in the electronic notification that facilitates check reordering or replenishment by the client while remaining in a secure, authenticated environment.

In accordance with illustrated process block 806, the check replenishment widget also includes a machine-readable two-dimensional barcode such as a QR code (e.g., QR code 508) that facilitates a second mode of check reordering or replenishment by the client while remaining in a secure, authenticated network environment.

As illustrated in FIG. 9, illustrated process block 902 includes receiving, by one or more financial institution servers (e.g., one or more financial institution servers 200) associated with a financial institution and from a client device (e.g., client device 100) executing a financial institution mobile application or a financial institution web application over a communication network, a check replenishment order from the financial institution.

The computer-implemented method 900 may then proceed to illustrated decision block 904, which includes capturing, from a QR code, client data and information related to the check replenishment order. Alternatively, the client data and information related to the check replenishment order may be captured by manual entry the client.

The computer-implemented method 900 may then proceed to illustrated process block 906, which includes executing the check replenishment order.

In accordance with illustrated process block 906, executing the check replenishment order comprises printing a new series of checks for issuance to the client.

In accordance with one or more embodiments set forth, described, and/or illustrated herein, the client device 100 and the one or more financial institution servers 200 could function in a fully virtualized environment. A virtual machine is where all hardware is virtual and the operation is run or executed over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software executing on hardware platform, and one or more virtual machines executing on hardware platform by way of virtualization software. Virtualization software is therefore logically interposed between the physical hardware of hardware platform and guest system software executing "in" virtual machine.

Memory of the hardware platform may store virtualization software and guest system software executing in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A server computing system comprising:
a user authentication module;
a mobile application module having a financial institution mobile application and a check reordering mobile application;
one or more processors having at least one hardware circuit; and
a non-transitory memory coupled to the one or more processors, the non-transitory memory including a set of instructions, which when executed by the one or more processors, cause the one or more processors to perform operations including:
transmitting, via the user authentication module, a request to a client device for user authentication credentials;
capturing, from the client device via the user authentication module, the user authentication credentials;
authenticating, via the user authentication module, the client device as an authenticated client device in a secure, authenticated network environment;
detecting, via the check reordering mobile application, an issuance of a check in a series of checks associated with an account;
determining, via the check reordering mobile application in response to the detection and based on predetermined check replenishment criteria, that the account requires check replenishment;
generating and causing, via the check reordering mobile application during execution of the financial institution mobile application by the authenticated client device, display of a graphical user interface (GUI) comprising a dashboard having financial account content on a user interface of the authenticated client device;
generating and causing, via the check reordering mobile application in response to the determination that the account requires check replenishment, display of an electronic alert comprising a check replenishment widget on the dashboard, the check replenishment widget including a user-engageable link embedded therein and a machine-readable barcode containing client data to initiate an automated check replenishment order by the authenticated client device;
bypassing, based on the previous client device authentication, a separate authenticating process of a check replenish entity in response to decoding the machine-readable, two-dimensional barcode, and establishing a direct electronic connection between the authenticated client device and the check replenish entity in the secure, authenticated network environment; and
capturing the client data from the authenticated client device in response to the decoding of the machine-readable, two-dimensional barcode, and populating the client data into checks to be replenished.

2. The server computing system of claim 1, wherein the predetermined check replenishment criteria comprises detecting issuance of a first check in a final series of checks of a checkbook associated with the account.

3. The server computing system of claim 1, wherein the set of instructions, which when executed by the one or more processors, cause the one or more processors to perform operations further including receiving, from the authenticated client device, a confirmation of the automated check replenishment order.

4. The server computing system of claim 1, wherein the machine-readable, two-dimensional barcode comprises a quick response (QR) code.

5. A computer program product for including at least one non-transitory computer readable medium, comprising a set of instructions, which when executed by one or more processors of a server computing system comprising a user authentication module and a mobile application module having a financial institution mobile application and a check reordering mobile application, cause the one or more processors to perform operations including:
transmitting, via the user authentication module, a request to a client device for user authentication credentials;
capturing, from the client device via the user authentication module, the user authentication credentials;
authenticating, via the user authentication module, the client device as an authenticated client device in a secure, authenticated network environment;
detecting, via the check reordering mobile application, an issuance of a check in a series of checks associated with an account;
determining, via the check reordering mobile application in response to the detection and based on predetermined check replenishment criteria, that the account requires check replenishment;
generating and causing, via the check reordering mobile application during execution of the financial institution mobile application by the authenticated client device, display of a graphical user interface (GUI) comprising a dashboard having financial account content on a user interface of the authenticated client device;
generating and causing, via the check reordering mobile application in response to the determination that the account requires check replenishment, display of an electronic alert comprising a check replenishment widget on the dashboard, the check replenishment widget including a user-engageable link embedded therein and a machine-readable barcode containing client data to initiate an automated check replenishment order by the authenticated client device;
bypassing, based on the previous client device authentication, a separate authenticating process of a check replenish entity in response to decoding the machine-readable, two-dimensional barcode, and establishing a direct electronic connection between the authenticated client device and the check replenish entity in the secure, authenticated network environment; and
capturing the client data from the authenticated client device in response to the decoding of the machine-readable, two-dimensional barcode, and populating the client data into checks to be replenished.

6. The computer program product of claim 5, wherein the predetermined check replenishment criteria comprises detecting issuance of a first check in a final series of checks of a checkbook associated with the account.

7. The computer program product of claim 5, wherein the set of instructions, which when executed by the one or more processors, cause the one or more processors to perform operations further including receiving, from the authenticated client device, a confirmation of the automated check replenishment order.

8. The computer program product of claim 5, wherein the machine-readable, two-dimensional barcode comprises a quick response (QR) code.

9. A computer-implemented method for automated check replenishment, the computer-implemented method comprising:

transmitting, via a user authentication module, a request to a client device for user authentication credentials;

capturing, from the client device via the user authentication module, the user authentication credentials;

authenticating, via the user authentication module, the client device as an authenticated client device in a secure, authenticated network environment;

detecting, via a check reordering mobile application, an issuance of a check in a series of checks associated with an account;

determining, via the check reordering mobile application in response to the detection and based on predetermined check replenishment criteria, that the client requires check replenishment;

generating and causing, via the check reordering mobile application during execution of a financial institution mobile application by the authenticated client device, display of a graphical user interface (GUI) comprising a dashboard having financial account content on a user interface of the authenticated client device;

generating and causing, via the check reordering mobile application in response to the determination that the account requires check replenishment, display of an electronic alert comprising a check replenishment widget on the dashboard, the check replenishment widget including a user-engageable link embedded therein and a machine-readable barcode containing client data to initiate an automated check replenishment order by the authenticated client device;

bypassing, based on the previous client device authentication, a separate authenticating process of a check replenish entity in response to decoding the machine-readable, two-dimensional barcode, and establishing a direct electronic connection between the authenticated client device and the check replenish entity in the secure, authenticated network environment; and capturing the client data from the authenticated client device in response to the decoding of the machine-readable, two-dimensional barcode, and populating the client data into checks to be replenished.

10. The computer-implemented method of claim 9, wherein the predetermined check replenishment criteria comprises detecting issuance of a first check in a final series of checks of a checkbook associated with the account.

11. The computer-implemented method of claim 9, further comprising receiving, from the authenticated client, a confirmation of the automated check replenishment order.

12. The computer-implemented method of claim 9, wherein the machine-readable, two-dimensional barcode comprises a quick response (QR) code.

*     *     *     *     *